United States Patent
Barkan et al.

(10) Patent No.: US 11,200,392 B2
(45) Date of Patent: Dec. 14, 2021

(54) INTERLEAVED FRAME TYPES OPTIMIZED FOR VISION CAPTURE AND BARCODE CAPTURE

(71) Applicant: ZEBRA TECHNOLOGIES CORPORATION, Lincolnshire, IL (US)

(72) Inventors: Edward Barkan, Miller Place, NY (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/807,909

(22) Filed: Mar. 3, 2020

(65) Prior Publication Data

US 2021/0279436 A1   Sep. 9, 2021

(51) Int. Cl.
*G06K 7/14* (2006.01)
*G06N 3/08* (2006.01)

(52) U.S. Cl.
CPC ............. *G06K 7/1413* (2013.01); *G06N 3/08* (2013.01)

(58) Field of Classification Search
CPC .. G06K 7/1404; G06K 7/1413; G06K 7/1417; G06K 7/1443; G06K 7/1447
See application file for complete search history.

(56) References Cited

U.S. PATENT DOCUMENTS

| | | | |
|---|---|---|---|
| 9,286,502 B1 * | 3/2016 | Ashby | G06K 7/10851 |
| 2015/0076225 A1 * | 3/2015 | Sweeney | G06K 19/06037 |
| | | | 235/380 |
| 2017/0174439 A1 * | 6/2017 | Ripley | B29B 17/02 |
| 2019/0164262 A1 * | 5/2019 | Cellier | G06T 5/009 |
| 2020/0356742 A1 * | 11/2020 | Feng | G06K 9/00201 |

* cited by examiner

*Primary Examiner* — Laura A Gudorf
(74) *Attorney, Agent, or Firm* — Yuri Astvatsaturov

(57) ABSTRACT

A barcode reader configured to capture interleaved frame types optimized for vision capture and barcode capture are disclosed herein. An example barcode reader is configured to operate in a pre-determined repetitive pattern of capturing a first frame and capturing a second frame over a reading cycle having a fixed duration after a triggering event, wherein the first frame is captured over a first exposure period having a first duration, and the second frame is captured over a second exposure period having a second duration, and wherein the first frame is associated with a first brightness parameter, and the second frame is associated with a second brightness parameter.

14 Claims, 4 Drawing Sheets ately with the first frame at a decode module; compress image data associated with the second frame; and send the compressed image data associated with the second frame to an image monitoring system.
INTERLEAVED FRAME TYPES OPTIMIZED FOR VISION CAPTURE AND BARCODE CAPTURE

BACKGROUND

Some barcode readers are capable of both barcode decoding and other imaging applications, such as, e.g., object recognition for identifying scanned items, facial recognition, identifying fraudulent behavior such as ticket-switching, sweethearting, scan avoidance, etc. Such barcode readers typically include two cameras—one for barcode decoding, and one for other imaging applications. Barcode readers that include two cameras can be expensive and generally require a larger housing to store both cameras. However, using one camera for both barcode decoding and other imaging applications can be difficult because exposure length, brightness, gain, resolution, etc., that are optimized for capturing frames used in barcode decoding are typically not appropriate for capturing frames used in other imaging applications, and vice versa.

SUMMARY

In an embodiment, the present invention is a barcode reader configured to operate in a pre-determined repetitive pattern of capturing a first frame and capturing a second frame over a reading cycle having a fixed duration after a triggering event, wherein the first frame is captured over a first exposure period having a first duration, and the second frame is captured over a second exposure period having a second duration, and wherein the first frame is associated with a first brightness parameter, and the second frame is associated with a second brightness parameter.

In a variation of this embodiment, the first and second frame are captured by the same camera. In another variation of this embodiment, the barcode reader further comprises a processor configured to analyze image data associated with the first frame to decode a barcode. In yet another variation of this embodiment, the barcode reader further comprises a processor configured to analyze image data associated with the second frame to identify one or more of: a target object, a person, or a gesture.

In another embodiment, the present invention is a barcode reader configured to capture a first frame; capture a second frame; and send the second frame to a convolutional neural network for non-decoding purposes.

In a variation of this embodiment, sending the second frame to the convolutional neural network includes sending the second frame to a remote server.

In yet another embodiment, the present invention is a barcode reader configured to: capture a first frame; capture a second frame; and send the second frame to a remote server for non-decoding purposes.

In still yet another embodiment, the present invention is a barcode reader configured to: capture a first frame; capture a second frame; process uncompressed image data associated with the first frame at a decode module; compress image data associated with the second frame; and send the compressed image data associated with the second frame to an image monitoring system.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
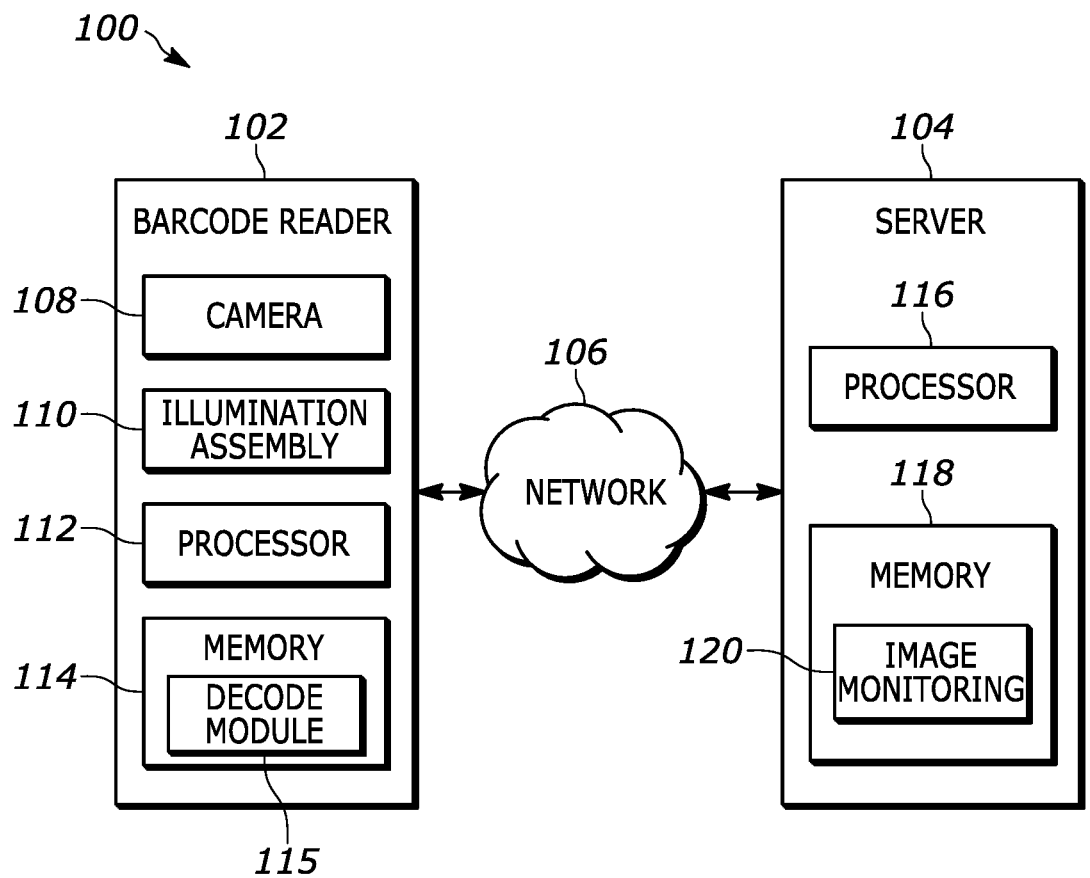
FIG. 1A illustrates a block diagram of an example system including a logic circuit for implementing the example methods and/or operations described herein, including techniques for using a single camera of a barcode reader to capture frames for multiple imaging applications by interleaving frames used for each imaging application.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some barcode readers are capable of both barcode decoding and other imaging applications, such as, e.g., object recognition for identifying scanned items, facial recognition, identifying fraudulent behavior such as ticket-switching, sweethearting, scan avoidance, etc. Such barcode readers typically include two cameras—one for barcode decoding, and one for other imaging applications. Barcode readers that include two cameras can be expensive and generally require a larger housing to store both cameras. However, using one camera for both barcode decoding and other imaging applications can be difficult because exposure length, brightness, gain, resolution, etc., that are optimized for capturing frames used in barcode decoding are typically not appropriate for capturing frames used in other imaging applications, and vice versa.

That is, when capturing a frame used for near field barcode reading or near field object recognition (e.g., in some examples, item recognition for produce items), a camera or image sensor will typically use bright illumination and short exposures, tending to darken background (far field) objects. In contrast, when capturing a frame used for (far field) vision applications, a camera or image sensor will typically use long exposures with no illumination so that actions and objects in the far field (e.g. beyond the scan platter) may be captured. Thus, captured frames used for barcode reading are typically not ideal for detecting scan avoidance, in which a user might sweep an object through the camera FOV but out of the scanner's decode range, or other far field activity. Similarly, captured frames used for vision applications are typically not ideal for decoding barcodes due to the decreased illumination.

The present disclosure provides a barcode reader that is capable of utilizing a single camera for both barcode decoding and other imaging applications by interleaving frame types optimized for barcode capture and vision capture, respectively. For example, in a barcode reading frame, a brief exposure and bright illumination can be used to freeze an image of a moving object to result in snappy barcode reading when barcodes are swiped past (e.g., in the near field of view of the camera). In a vision frame, a longer exposure (or autoexposure) with no (or reduced) illumination to capture video frames using ambient illumination, including details beyond the typical scan range (e.g., in the far field of view of the camera). For instance, in some examples, the barcode reading frame and the vision frame may alternate every other frame, or may alternate in some other predetermined pattern (e.g., two barcode reading frames then one vision frame, two vision frames then one barcode reading frame, etc.). Barcode reading frames may be sent to an image signal processor (ISP) and to a decoder for processing, while vision frames may be sent through the ISP to electronics for analysis/analytics and may not be used for decoding.

Furthermore, in some examples the camera or image sensor may interleave additional frame types with the barcode reading frame and/or the vision capture frame. For instance, an enhanced item recognition frame may be used in cases in which the recognition of an item is prioritized, e.g., for identifying fruits or vegetables being weighed, or identifying expensive items or items that are at high risk of theft, as determined by the system. For instance, in an enhanced item recognition frame, a long exposure and illumination, with reduced gain, can be used to enhance contrast and clarity of data for items on the platter, while simultaneously darkening the background information to help reduce extraneous data. In some examples, enhanced item recognition frames may use an RGB color transformation for maximum color data to aid in item recognition.

In some examples, a camera or image sensor with a sufficiently high framerate may be configured to constantly alternate between barcode reading frames, vision capture frames, and enhanced item recognition frames in a predetermined pattern (e.g., one barcode reading frame, then one vision capture frame, then one enhanced item recognition frame; two barcode reading frames, then one vision capture frame, then one enhanced item recognition frame; one barcode reading frame, then two vision capture frames, then one enhanced item recognition frame; one barcode reading frame, then one vision capture frame, then two enhanced item recognition frames; etc.). In other examples, the camera or image sensor may alternate between barcode reading frames and vision capture frames in in a first mode, but may switch to a second mode of alternating between all three frame types (e.g., including enhanced item recognition frames) when certain conditions are met, e.g., when there is a positive dwell on the scale, when a high-priority item is scanned, etc.

Advantageously, using the techniques described herein, different types of frames may be captured essentially simultaneously and compared, e.g., to ensure that the barcode and item match, or to precisely identify an individual using the barcode reader when a particular barcode is scanned (for example, to detect ticket switching or other fraudulent behavior).

FIG. 1A illustrates a block diagram of an example system 100 including a logic circuit for implementing the example methods and/or operations described herein, including techniques for using a single camera of a barcode reader to capture frames for multiple imaging applications by interleaving frames used for each imaging application. The system 100 may include a barcode reader 102 and a server 104 configured to communicate via a network 106 (e.g., a wired or wireless network).

The barcode reader 102 may include a camera (or other image sensor) 108 and an illumination assembly 110, as well as a processor 112 and a memory 114.

The camera 108 may be configured to capture (near-field) image and/or video frames of objects being scanned (e.g., at a checkout station) and barcodes attached to such objects, e.g., through a window of the barcode reader 102. When capturing an image and/or video frame to be used for barcode reading, the camera 108 may use a short exposure. Furthermore, in some instances, the camera 108 may apply a YUV filter (e.g., to maximize resolution on black and white barcodes) to images and/or video frames to be used for barcode reading. Furthermore, the illumination assembly 110 of the barcode reader 102 may use an increased brightness or longer-duration period of illumination as the camera 108 captures the image and/or video frame to be used for barcode reading.

Furthermore, the camera 108 may be configured to capture far-field image and/or video frames to be used for vision capture applications. For instance, far-field image or video frames of people operating the barcode reader to scan objects may be analyzed using vision capture applications to detect instances of theft or fraud, such as, e.g., sweethearting, ticket-switching, scan avoidance, etc. When capturing an image and/or video frame to be used for vision capture, the camera 108 may use a longer exposure than when capturing an image and/or video frame to be used for barcode reading (or an auto-exposure). Moreover, in some examples, the camera 108 may apply a compressed YUV filters (such as YUV422) for maximized color data for a lower resolution image or video frame used for far-field image capture. Furthermore, the illumination assembly 110 of the barcode reader 102 may use a decreased brightness or shorter-duration period of illumination when the camera captures far-field image and/or video frames to be used for vision capture applications.

In particular, the camera 108 may be configured to alternate between capturing frames to be used for barcode reading or other near-field applications and frames to be used for far-field vision capture applications. For instance, the camera 108 may repeatedly capture a first frame to be used for barcode reading and a second frame to be used for vision capture applications in a repetitive pattern over a barcode reading cycle. For example, the camera 108 may capture the first frame and then the second frame repeatedly. In other examples, the camera 108 may capture two first frames and then one second frame repeatedly, or one first frame and then two second frames repeatedly, or any other suitable repetitive pattern of capturing the two types of frames.

In some examples, camera 108 may begin a barcode reading cycle based on a triggering event, and may cease the barcode reading cycle after a fixed duration of time after the triggering event. For instance, the triggering event may be a "wake" event. For instance, the triggering event may be motion detected by a motion sensor (not shown) configured to detect motion of a handheld barcode reader (or a handheld portion of a barcode reader). Furthermore, in some examples, a scan event (e.g., a user pressing a button associated with the barcode reader 102 to scan a barcode) may be a "wake" event, or may otherwise be considered a triggering event. Additionally, in some examples, the triggering event may be an object detection event (e.g., a motion sensor, image sensor, or other sensor (not shown) associated with the barcode reader 102 may detect an object in the proximity of the barcode reader 102). Moreover, in some examples, the triggering event may occur when an electronic scale (not shown) associated with the barcode reader measures a stable weight above a threshold weight for a time period longer than a threshold time period, e.g., indicating that an object to be scanned has been placed on a platter associated with the barcode reader Additionally, in some examples, the camera 108 may be configured to capture image and/or video frames to be used for enhanced item recognition. For instance, the camera 108 may capture enhanced item recognition frames using a long exposure with reduced gain compared to barcode reading frames or vision capture frames. Furthermore, the illumination assembly 110 may be configured to illuminate a field of view (FOV) of the camera 108 for a longer period of time (e.g., as in the barcode reading frames) when the camera is capturing enhanced item recognition frames.

In some examples, the camera 108 may be further configured to alternate between capturing frames to be used for barcode reading or other near-field applications, frames to be used for far-field vision capture applications, and frames to be used for enhanced item recognition, e.g., in a repetitive pattern, as discussed above. In particular, in some examples, the camera 108 may be configured to switch from a mode in which the camera 108 alternates between capturing barcode reading frames and vision capture frames only to a mode in which the camera 108 alternates between capturing barcode reading frames, vision capture frames, and enhanced item recognition frames when certain conditions are met, e.g., when there is a positive dwell on the scale, when a high-priority item is scanned, etc.

In some examples, the camera 108 may be configured to capture images from multiple FOVs, e.g., FOVs that pass through more than one window of the barcode reader 102, or to more than one FOV that passes through the same window of a reading device. That is, in some examples, the camera 108 may be configured to capture near-field images from one FOV, far-field images from another FOV, and/or enhanced item recognition frames from still another FOV.

The processor 112, which may be, for example, one or more microprocessors, controllers, and/or any suitable type of processors, may interact with the memory 114 accessible by the one or more processors 112 (e.g., via a memory controller) to obtain, for example, machine-readable instructions stored in the memory 114 corresponding to, for example, the operations represented by the flowcharts of this disclosure, including those of FIGS. 2-5. In particular, the instructions stored in the memory 114 may include instructions for executing a decode module 115, configured to decode barcodes in barcode reading image or video frames captured by the camera 108. In some examples, the instructions stored in the memory 114 may include instructions for executing an image monitoring, item recognition, facial recognition, and/or gesture recognition application (not shown) configured to analyze vision capture or enhanced item recognition frames captured by the camera 108 to identify items, individuals, gestures, etc., captured in image data associated with the frames, e.g., using a machine learning analysis and/or convolutional neural network analysis. Furthermore, in some examples, the instructions stored in the memory 114, when executed by the processor 112, may cause the barcode reader 102 to transmit vision capture or enhanced item recognition frames to the server 104 for further analysis.

The server 104 may include a processor 116 and a memory 118. The processor 116, which may be, for example, one or more microprocessors, controllers, and/or any suitable type of processors, may interact with the memory 118 accessible by the one or more processors 116 (e.g., via a memory controller) to obtain, for example, machine-readable instructions stored in the memory 118 corresponding to, for example, the operations represented by the flowcharts of this disclosure, including those of FIGS. 2-5. In some examples, the instructions stored in the memory 118 may include instructions for executing an image monitoring, item recognition, facial recognition, and/or gesture recognition application (120) configured to analyze vision capture or enhanced item recognition frames captured by the camera 108 to identify items, individuals, gestures, etc., captured in image data associated with the frames, e.g., using a machine learning analysis and/or convolutional neural network analysis.

Figure 1B:
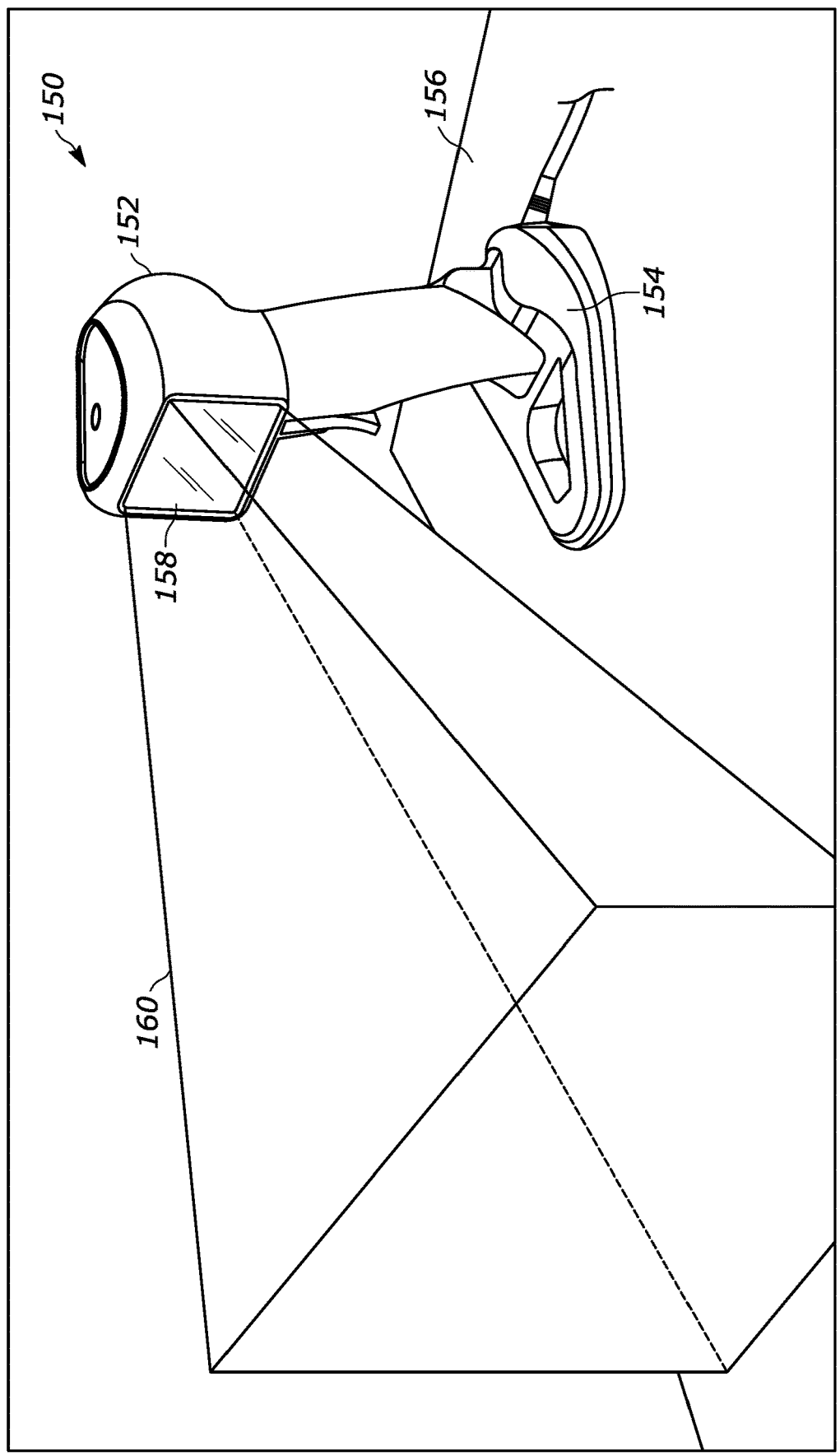
FIG. 1B illustrates an exemplary handheld or presentation barcode reader that may be used in the example methods and/or operations described herein, including techniques for using a single camera of a barcode reader to capture frames for multiple imaging applications by interleaving frames used for each imaging application.

FIG. 1B illustrates an exemplary handheld or presentation barcode reader 150 that may be used in the object recognition systems and methods described herein. For instance, the barcode reader 102 shown in FIG. 1A may be a handheld or presentation barcode reader 150 as shown in FIG. 1B. The handheld or presentation barcode reader 150 may include a handheld reader 152 and a stationary cradle 154 mounted to a workstation surface 156. The handheld reader 152 rests in the stationary cradle to establish a hands-free scanning mode, also termed a presentation mode, for scanning objects. The handheld reader 152 therefore operates as an imaging reader, with a scanning window 158 in the housing of the handheld reader 152, behind which may be, e.g., a camera 108 and/or illumination assembly 110 as described with respect to FIG. 1A. In the hands-free scanning mode, the handheld reader 152 defines a horizontally and vertically extending FOV 160. In accordance with the techniques herein, the handheld reader 152 captures images of an object for identification and imaging within the FOV 160. A trigger 158 may be used to initiate a hands-free scanning mode, in some examples. In some examples, the hands-free scanning made is initiated by placement of the reader 152 into the cradle 154.

Figure 2:
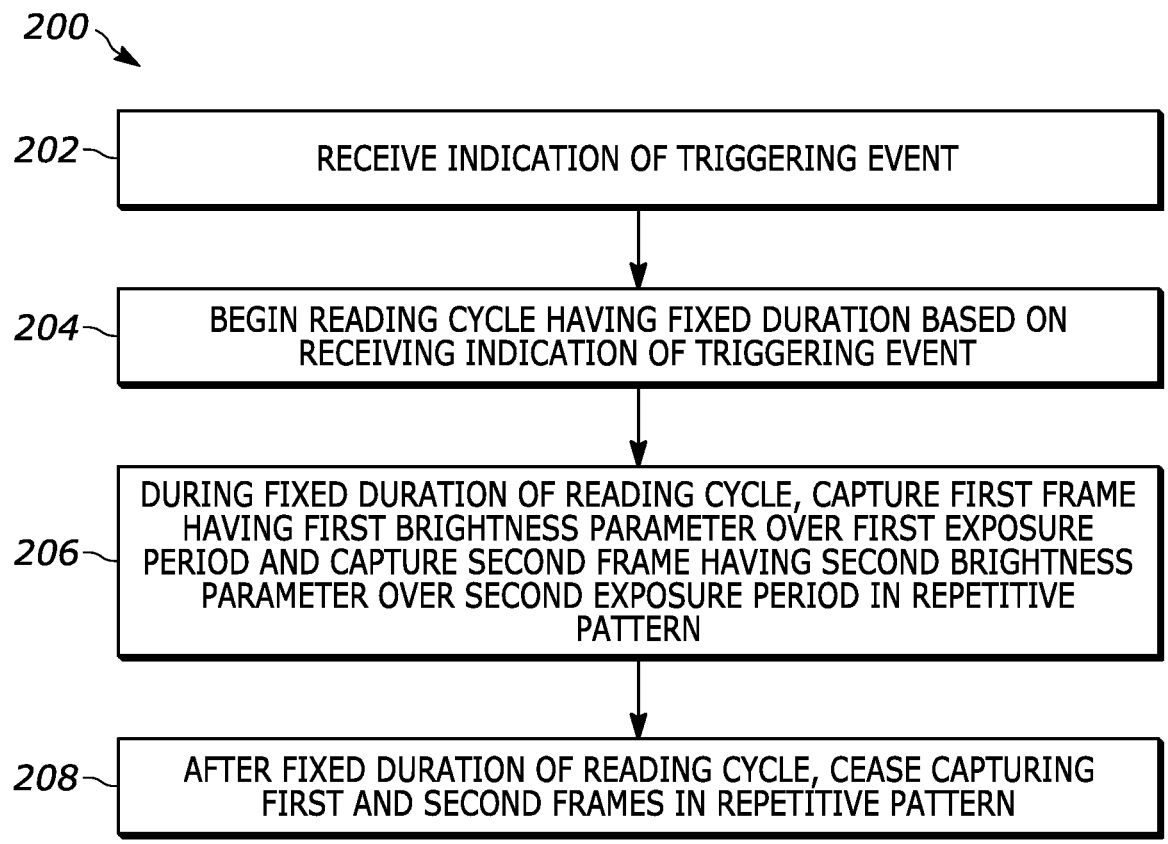
FIG. 2 illustrates a block diagram of an example process as may be implemented by the system of FIG. 1A, for implementing example methods and/or operations described herein, including techniques for using a single camera of a barcode reader to capture frames for multiple imaging applications by interleaving frames used for each imaging application.

FIG. 2 illustrates a block diagram of an example process 200 as may be implemented by the logic circuit of FIG. 1A, for implementing example methods and/or operations described herein, including techniques for using a single camera of a barcode reader to capture frames for multiple imaging applications by interleaving frames used for each imaging application, as may be performed by the system 100, barcode reader 102, or server 104 of FIG. 1A.

At a process 202, a barcode reader may receive an indication of a triggering event. In some examples, the triggering event may be a "wake" event. For instance, the triggering event may be motion detected by a motion sensor configured to detect motion of a handheld barcode reader (or a handheld portion of a barcode reader). Furthermore, in some examples, a scan event (e.g., a user pressing a button associated with the barcode reader to scan a barcode) may be a "wake" event, or may otherwise be considered a triggering event. Additionally, in some examples, the triggering event may be an object detection event (e.g., a motion sensor, image sensor, or other sensor associated with the barcode reader may detect an object in the proximity of the barcode reader). Moreover, in some examples, the triggering event may occur when an electronic scale associated with the barcode reader measuring a stable weight above a threshold weight for a time period longer than a threshold time period, e.g., indicating that an object to be scanned has been placed on a platter associated with the barcode reader.

At a process 204, the barcode reader may begin a reading cycle having a fixed duration based on receiving the indication of the triggering event.

At a process 206, during the reading cycle, the barcode reader (e.g., a single camera or other image sensor of the barcode reader) may capture a first frame and a second frame in a repetitive pattern. For example, the camera or other image sensor of the barcode reader may alternate between the first frame and the second frame, or may capture the first and second frame in some other repetitive pattern (e.g., two first frames, then one second frame, then two first frames, then one second frame, and so on; or one first frame, then two second frames, then one first frame, then two second frames, and so on; or some other repetitive pattern).

In particular, the barcode reader may capture the first frame over a first exposure period (e.g., having a first duration) and capture the second frame over a second exposure period (e.g., having a second duration, different from the first duration) in the repetitive pattern. Moreover, in some examples, the first frame may be associated with a first brightness parameter, while the second frame is associated with a second brightness parameter, different from the first brightness parameter. Furthermore, in some examples, image data associated with the first frame may be captured at a higher resolution than image data associated with the second frame.

For example, the first frame may be a barcode capture frame while the second frame is a vision capture frame. Accordingly, the second frame may have a longer exposure period, to capture images or video suited or optimized for vision capture applications, while the first frame may have a shorter exposure period, to capture images suited or optimized for barcode decoding. Similarly, as discussed above, image data associated with the first frame may be captured at a higher resolution suited for or optimized for barcode decoding applications, while image data associated with the second frame may be captured at a lower resolution suited for vision capture applications.

Moreover, the brightness parameter for the first frame may be suited for or optimized for barcode capture applications while the brightness parameter for the second frame may be suited for or optimized for vision capture applications. For instance, the brightness parameter may be an illumination duration parameter. Accordingly, in some examples, the period of time for which an illumination assembly is activated during the first frame (a first illumination duration period) may be longer than the period of time for which the illumination assembly is activated during the second frame (a second illumination duration period), causing a "brighter" illumination in images captured in the first frame compared to images captured in the second frame. Moreover, in some examples, the second frame may not be illuminated at all.

Furthermore, in some examples, the barcode reader may additionally capture a third frame (or a fourth frame, or a fifth frame, etc.) as part of the repetitive pattern during the reading cycle. In particular, in some examples, the barcode reader may always include the third frame and/or other additional frame in the repetitive pattern during the reading cycle, while in other examples, the barcode reader may include the third frame and/or other additional frame in the repetitive pattern only when certain conditions are met. For instance, the repetitive pattern may include the third frame and/or other additional frame after the barcode reader receives an indication that there is a positive dwell on a scale associated with the barcode reader, or an indication that a high-priority item has been scanned (e.g., based on a decode of a barcode from image data associated with the first frame, based on object recognition of a high-priority item from image data associated with the first frame, etc.), but otherwise may not include the third frame and/or other additional frame.

In some examples, the third frame may be an enhanced item recognition frame. The third frame may be captured over a third exposure period that has a third duration, which may be longer than the duration of the first exposure period. Furthermore, the period of time for which the illumination assembly is activated for the third frame may be longer than the period of time for which the illumination assembly is activated for the second frame, causing a "brighter" illumination in images captured in the third frame than in images captured in the second frame. Moreover, the third frame may be associated with a third gain, which may be a smaller gain than gain associated with the first frame.

At a process 208, after the fixed duration of the reading cycle, the barcode reader may cease capturing the first and second frames in the repetitive pattern.

In some examples, the process 200 may further include analyzing image data associated with the first frame to decode a barcode. Furthermore, in some examples, the process 200 may further include analyzing image data associated with the first frame to identify an object captured in the first frame. Additionally, in some examples, the process 200 may include applying a color filter to image data associated with the first frame as part of analyzing or processing the image data associated with the first frame.

Furthermore, in some examples, the process 200 may further include analyzing image data associated with the second frame (which may include video data) using computer vision techniques to identify, e.g., an object (such as a produce item, and/or an object to which a barcode is affixed or attached), a person, a gesture (or other movement or action), etc. For instance, the image data from the second frame may be analyzed via a convolutional neural network. Additionally, in some examples, the process 200 may include applying a color filter to image data associated with the second frame as part of analyzing or processing the image data associated with the second frame. In particular, in some examples, the color filter applied to image data associated with the second frame may be different than a color filter applied to image data associated with the second frame.

Figure 3:
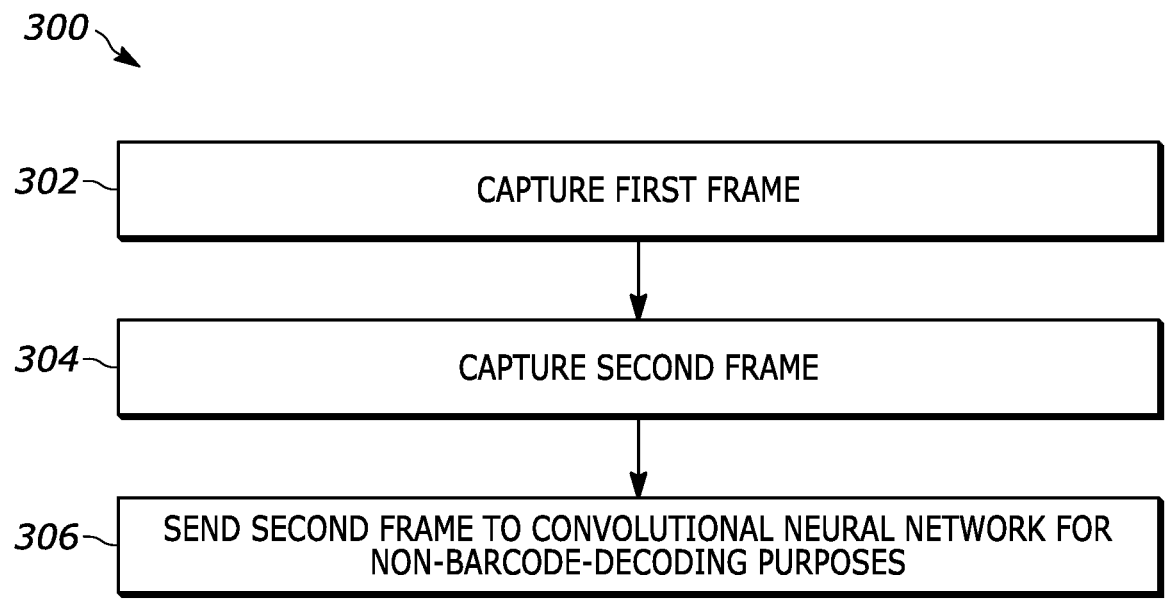
FIG. 3 illustrates a block diagram of an example process as may be implemented by the system of FIG. 1A, for implementing example methods and/or operations described herein, including techniques for using a single camera of a barcode reader to capture frames for multiple imaging applications by interleaving frames used for each imaging application.

FIG. 3 illustrates a block diagram of an example process 300 as may be implemented by the logic circuit of FIG. 1A, for implementing example methods and/or operations described herein, including techniques for using a single camera of a barcode reader to capture frames for multiple imaging applications by interleaving frames used for each imaging application, as may be performed by the system 100, barcode reader 102, or server 104 of FIG. 1A.

At a process 302, a barcode reader (e.g., a single camera or image sensor of the barcode reader) may capture a first frame. At a process 304, the barcode reader (e.g., the single camera or image sensor of the barcode reader) may capture a second frame. At a process 306, the barcode reader may send the second frame (i.e., image data associated with the second frame) to a convolutional neural network for non-barcode-decoding purposes. For example, the non-barcode purposes may include vision capture applications, such as, e.g., object recognition applications, facial recognition applications, gesture recognition applications, etc. In some examples, sending the second frame to the convolutional neural network includes sending the first frame to a remote server (e.g., server 104). In some examples, the process 300 may include the barcode reader (e.g., a processor of or associated with the barcode reader) analyzing image data associated with the first frame to decode a barcode captured in the first frame.

Figure 4:
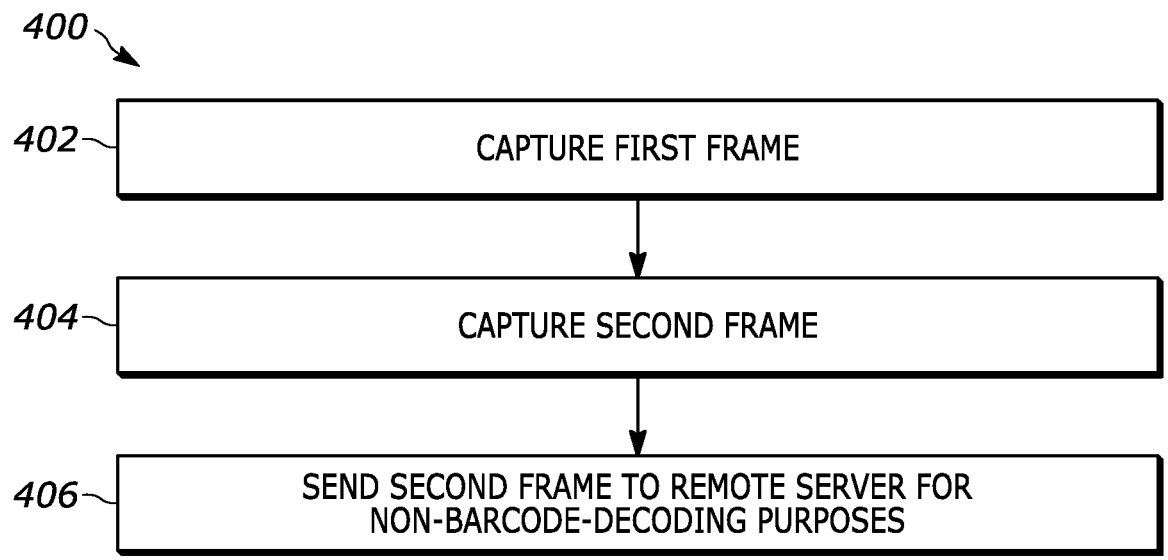
FIG. 4 illustrates a block diagram of an example process as may be implemented by the system of FIG. 1A, for implementing example methods and/or operations described herein, including techniques for using a single camera of a barcode reader to capture frames for multiple imaging applications by interleaving frames used for each imaging application.

FIG. 4 illustrates a block diagram of an example process 400 as may be implemented by the logic circuit of FIG. 1A, for implementing example methods and/or operations described herein, including techniques for using a single camera of a barcode reader to capture frames for multiple imaging applications by interleaving frames used for each imaging application, as may be performed by the system 100, barcode reader 102, or server 104 of FIG. 1A.

At a process 402, a barcode reader (e.g., a single camera or image sensor of the barcode reader) may capture a first frame. At a process 404, the barcode reader (e.g., the single camera or image sensor of the barcode reader) may capture a second frame. At a process 406, the barcode reader may send the second frame (i.e., image data associated with the second frame) to a remote server (e.g., server 104) for non-barcode-decoding purposes. For example, the non-barcode purposes may include vision capture applications, such as, e.g., object recognition applications, facial recognition applications, gesture recognition applications, etc. In some examples, the process 400 may include the barcode reader (e.g., a processor of or associated with the barcode reader) analyzing image data associated with the first frame to decode a barcode captured in the first frame.

Figure 5:
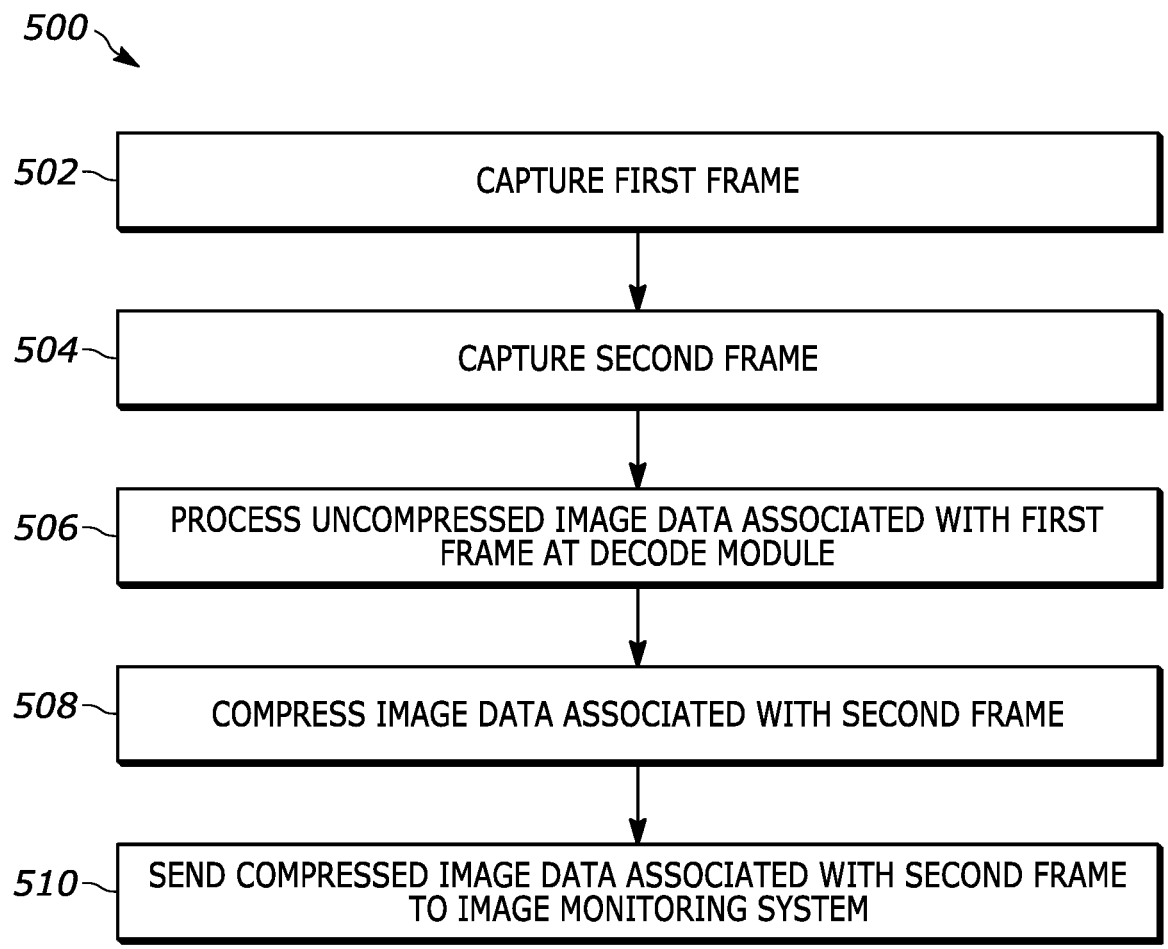
FIG. 5 illustrates a block diagram of an example process as may be implemented by the system of FIG. 1A, for implementing example methods and/or operations described herein, including techniques for using a single camera of a barcode reader to capture frames for multiple imaging applications by interleaving frames used for each imaging application.

FIG. 5 illustrates a block diagram of an example process 200 as may be implemented by the logic circuit of FIG. 1A, for implementing example methods and/or operations described herein, including techniques for using a single camera of a barcode reader to capture frames for multiple imaging applications by interleaving frame s used for each imaging application, as may be performed by the system 100, barcode reader 102, or server 104 of FIG. 1A.

At a process 502, a barcode reader (e.g., a single camera or image sensor of the barcode reader) may capture a first frame. At a process 504, the barcode reader (e.g., the single camera or image sensor of the barcode reader) may capture a second frame.

At a process 506, the barcode reader (e.g., a processor of the barcode reader or associated with the barcode reader) may process raw image data (e.g., uncompressed image data) associated with the first frame at a decode module to decode a barcode captured in the raw image data associated with the first frame.

At a process 508, the barcode reader (e.g., a process of the barcode reader or associated with the barcode reader) may compress raw image data associated with the second frame (e.g., including video data associated with the second frame). At a process 510, the barcode reader may send the compressed image or video associated with the second frame to an image monitoring system, e.g., for security monitoring purposes.

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The claims are:

1. A barcode reader configured to operate in a predetermined repetitive pattern of capturing a first frame and capturing a second frame over a reading cycle having a fixed duration after a triggering event,
wherein the first frame is captured over a first exposure period having a first duration, and the second frame is captured over a second exposure period having a second duration, and
wherein the first frame is associated with a first brightness parameter, and the second frame is associated with a second brightness parameter, and
wherein the barcode reader includes a processor configured to:
analyze image data associated with the first frame only to decode a barcode; and
analyze image data associated with the second frame to identify one or more of: a target object, a person, or a gesture.

2. The barcode reader of claim 1, wherein the second duration is longer than the first duration.

3. The barcode reader of claim 1, wherein the first brightness parameter is associated with a first illumination duration period, wherein the second brightness parameter is associated with a second illumination duration period, and wherein the first illumination duration period is longer than the second illumination duration period.

4. The barcode reader of claim 3, wherein the second illumination duration period is a zero duration period.

5. The barcode reader of claim 1, wherein the first and second frame are captured by a camera.

6. The barcode reader of claim 1, wherein the processor is configured to analyze the second image using a convolutional neural network.

7. The barcode reader of claim 1, further comprising a processor configured to apply a first color filter to image data associated with the first frame and configured to apply a second color filter to image data associated with the second frame.

8. The barcode reader of claim 1, wherein image data associated with the second frame includes video data.

9. The barcode reader of claim 1, wherein image data associated with the first frame is captured at a first resolution, wherein image data associated with second frame is captured at a second resolution, and wherein the first resolution is higher than the second resolution.

10. The barcode reader of claim 1, wherein the trigger event is based on an electronic scale associated with the barcode reader measuring a stable weight above a threshold weight for a time period longer than a threshold time period.

11. The barcode reader of claim 1, wherein the trigger event is a scan event.

12. The barcode reader of claim 1, wherein the trigger event is an object detection event.

13. The barcode reader of claim 1, wherein the repetitive pattern further includes capturing a third frame over the reading cycle,
wherein the third frame is captured over a third exposure period having a third duration, the third duration being longer than the first duration,
wherein the third frame is associated with a third gain, the third gain being smaller than a first gain associated with the first frame, and
wherein the third frame is associated with a third brightness parameter.

14. The barcode reader of claim 13, wherein the first brightness parameter is associated with a first illumination duration period, wherein the second brightness parameter is associated with a second illumination duration period, wherein the third brightness parameter is associated with a third illumination duration period, and wherein the third illumination duration period is longer than the second illumination duration period.

* * * * *